United States Patent

Suzuki

[15] 3,681,659

[45] Aug. 1, 1972

[54] AMPLIFIER PROTECTIVE CIRCUIT

[72] Inventor: Tadao Suzuki, Tokyo, Japan

[73] Assignee: Sony Corporation, Tokyo, Japan

[22] Filed: March 26, 1971

[21] Appl. No.: 128,365

Related U.S. Application Data

[63] Continuation-in-part of Ser. No. 775,386, Nov. 13, 1968.

[30] Foreign Application Priority Data

March 26, 1970 Japan........................45/25362

[52] U.S. Cl.....................317/16, 330/51, 330/207 P, 307/202, 307/93, 317/33 R, 317/31, 317/27

[51] Int. Cl.............................H02h 7/20, H02h 3/38

[58] Field of Search......317/16, 27, 31, 33; 307/202, 307/237, 93; 330/207 P, 51

[56] References Cited

UNITED STATES PATENTS

| | | | |
|---|---|---|---|
| 3,564,338 | 2/1971 | Teshirogi | 317/31 |
| 3,536,958 | 10/1970 | Sondermeyer | 317/33 R |
| 3,555,358 | 1/1971 | Gibbs | 307/202 X |

*Primary Examiner*—J. D. Miller
*Assistant Examiner*—Harvey Fendelman
*Attorney*—Hill, Sherman, Meroni, Gross & Simpson

[57] ABSTRACT

A protective circuit for protecting transistor amplifiers in which the transistors are interconnected with certain impedances and diodes with switching elements such that voltages and currents applied to the transistor are detected and utilized to sense when a condition exists which would injure the transistor. Bridge circuits and diodes are interconnected with the transistor to be protected and in certain embodiments a switching transistor is used with the bridge circuit and diode to protect the transistor.

12 Claims, 8 Drawing Figures

INVENTOR.
TADAO SUZUKI
BY
Hill, Sherman, Meroni, Gross & Simpson
ATTYS.

INVENTOR.
TADAO SUZUKI
BY
Hill, Sherman, Meroni, Gross & Simpson
ATTYS.

INVENTOR
TADAO SUZUKI
BY
Hill, Sherman, Meroni, Gross & Simpson
ATTYS.

INVENTOR.
TADAO SUZUKI
BY
Hill, Sherman, Meroni, Gross & Simpson
ATTYS.

INVENTOR.
TADAO SUZUKI
BY
Hill, Sherman, Meroni, Gross & Simpson
ATTYS.

AMPLIFIER PROTECTIVE CIRCUIT

CROSS-REFERENCE TO RELATED APPLICATIONS

This application is a continuation-in-part of the following applications: Transistor Protective Circuit which was mailed to the U. S. Patent Office on Dec. 7, 1970 and identified as attorney's Case No. 70,1068, and application Ser. No. 775,386 filed Nov. 13, 1968, now abandoned, entitled Transistor Protective Circuit.

BACKGROUND OF THE INVENTION

1. Field of the Invention:

This invention relates in general to protective circuits and, in particular, to a protective circuit for transistors which may be utilized in a power amplifier and provides means for limiting the currents flowing through the transistors.

2. Description of the Prior Art:

Short circuits of a load in a transistor amplifier results in the possibility of an excess current flowing in an output transistor capable of increasing the losses in its collector circuit and result in the destruction of the transistor. Prior art transistor amplifiers have utilized current or power limiting circuits which control the active condition of the transistor so as to protect the transistor from destruction due to short-circuiting of the load.

However, continuous short-circuiting of the load will cause an increase in the temperature at the junction of the transistor and destroy it. Temperature sensitive protective circuits have been utilized to detect the overload condition and thus protect the transistor. Thus the prior art requires that the current or power be limited or that the temperature be detected by a thermal sensitive detecting circuit. These devices are very complex and expensive. Also such systems are inaccurate and do not assure positive protection of the transistor due to the slow thermal response of a thermal sensitive protecting circuit, for example.

SUMMARY OF THE INVENTION

The present invention provides a protective circuit for transistors utilized in an amplifier which positively and effectively limits the current flowing in the transistors for their protection. The present invention provides a protective circuit for transistors which senses the power dissipation of the transistors and the impedance by the load connected to the transistor so as to protect the transistor.

In the present invention a protective circuit for transistors is provided which monitors the output voltage across a load of the amplifier and changes the conditions of the protective circuit as a function of the voltage across the load.

Figure 1:
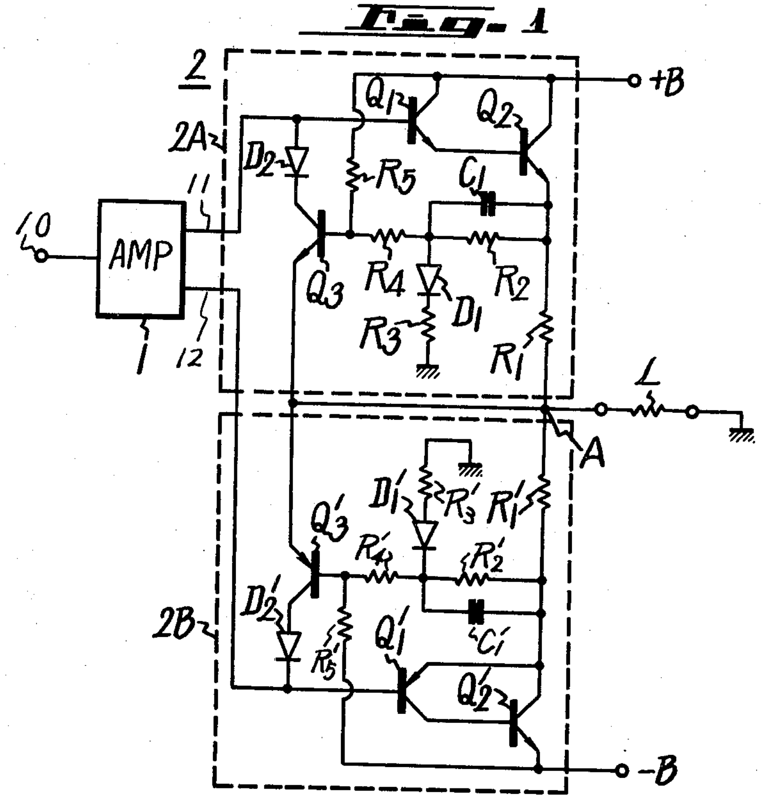
FIG. 1 is a connection diagram showing one example of an amplifier protection circuit of this invention.
Figure 4:
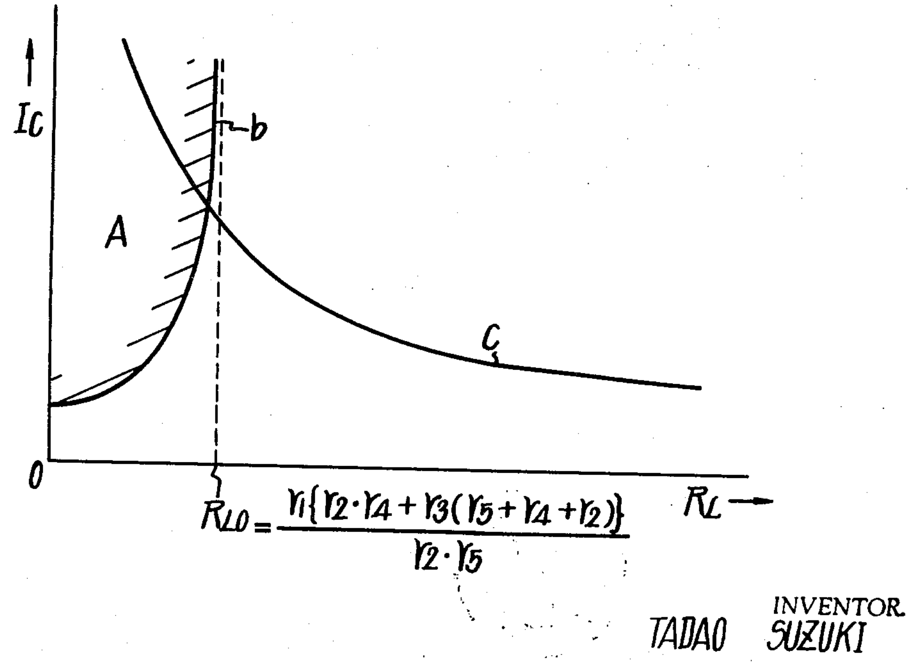
Figure 5:
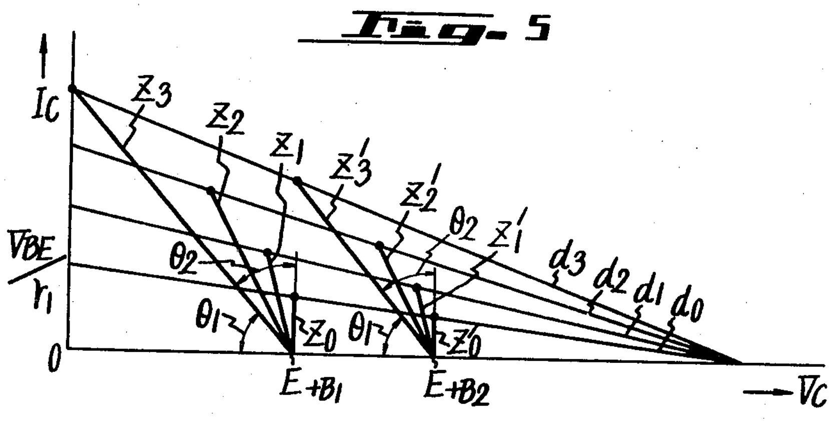
Figure 6:
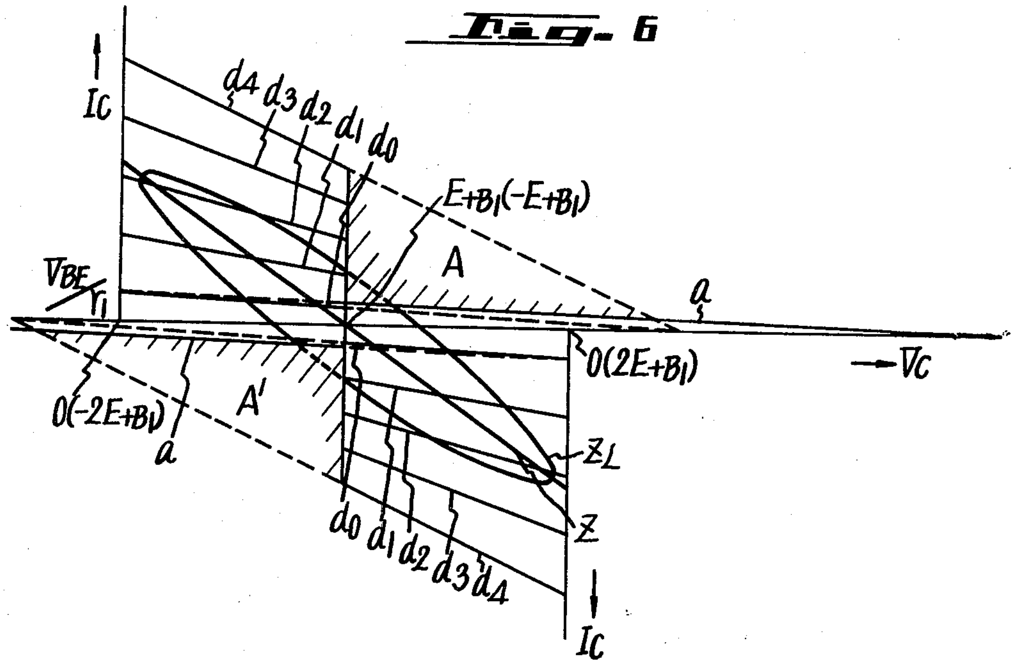
Figure 7:
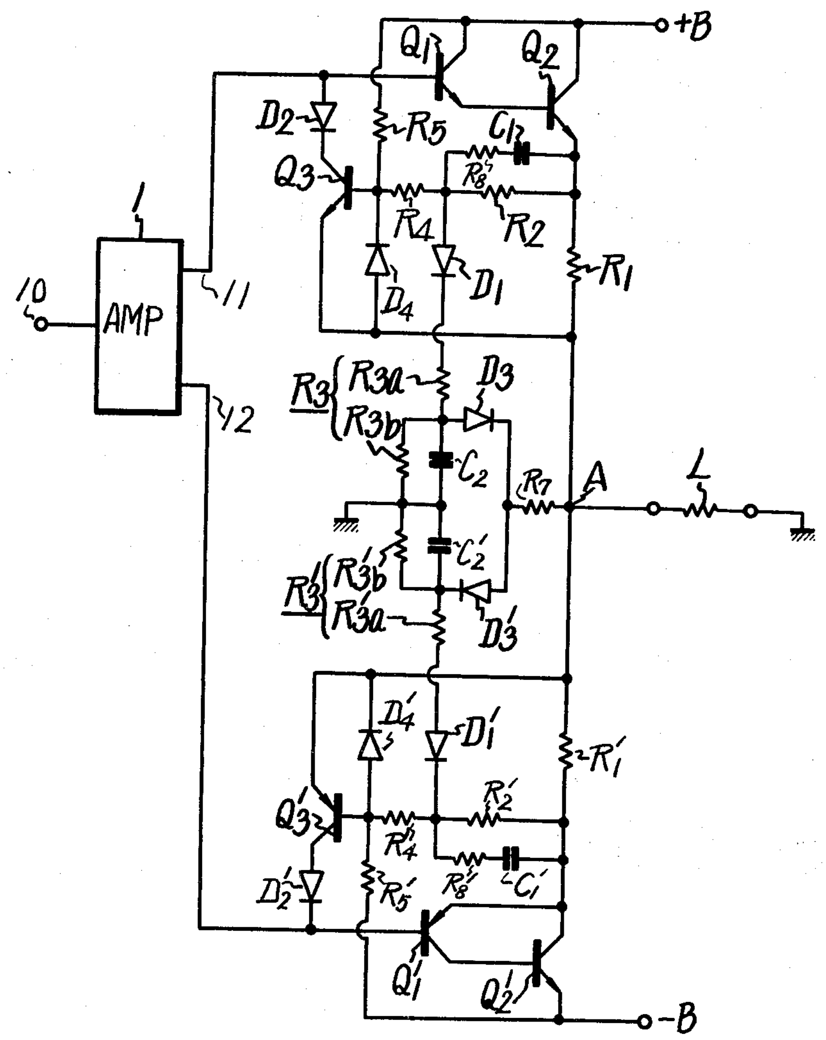
Figure 8:
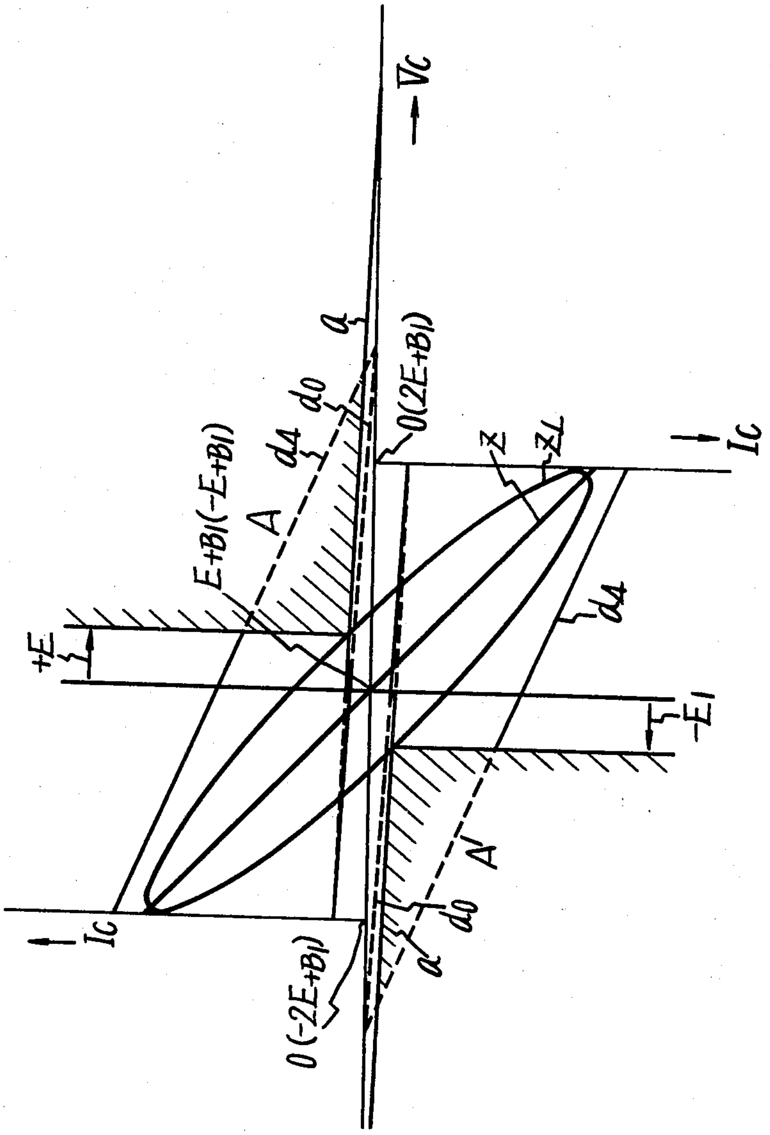

FIGS. 4–6, inclusive, are graphs for explaining the operation of the circuit shown in FIG. 1;

FIG. 7 is a connection diagram illustrating a modified form of this invention; and FIG. 8 is a graph for explaining the operation of the circuit depicted in FIG. 7.

DESCRIPTION OF THE PREFERRED EMBODIMENTS

FIG. 1 illustrates an input terminal 10 which supplies an input to an audio frequency amplifier 1 which includes a pre-amplifier stage and an exciting stage for an output circuit. The numeral 2 designates the output circuit of a transistor system including the protective circuit of the present invention. The output circuit 2 is divided into two portions 2A and 2B, and receives inputs on leads 11 and 12 from the amplifier 1. Lead 11 is connected to the base of a transistor $Q_1$ which has its emitter connected to the base of a transistor $Q_2$ in a Darlington connection. The collectors of transistors $Q_1$ and $Q_2$ are connected together and to +B and to one side of a resistor $R_5$ which has its other side connected to the base of a switching transistor $Q_3$. A resistor $R_1$ is connected between the emitter of the transistor $Q_2$ and an output point A.

A load, as for example a speaker coil, is designated as L and is connected between point A and ground. The emitter of the switching transistor $Q_3$ is connected to point A. Resistors $R_4$ AND $R_2$ are connected in series between the base of the transistor $Q_3$ and the emitter of the transistor $Q_2$. A diode $D_1$ and the resistor $R_3$ are connected in series between the junction point between the resistors $R_2$ and $R_4$ and ground. A diode $D_2$ is connected between the base of transistor $Q_1$ and the collector of transistor $Q_3$. A capacitor $C_1$ may be connected in parallel with resistor $R_2$.

The output circuit portion 2B is similar to portion 2A and includes output transistors $Q'_1$ and $Q'_2$ connected in Darlington connection with the input lead 12 connected to the base of the transistor $Q'_1$. The collector of transistor $Q'_1$ is connected to the base of transistor $Q'_2$ and the collector of transistor $Q'_2$ is connected to the emitter of transistor $Q'_1$ and to point A through a resistor $R'_1$. A negative bias voltage –B is connected to the emitter of transistor $Q'_2$.

A switching transistor $Q'_3$ has its emitter connected to point a and its collector connected to the anode of a diode $D'_2$. The cathode of diode $D'_2$ is connected to the base of transistor $Q'_1$. A resistor $R'_5$ is connected between the base of transistor $Q'_3$ and the emitter of transistor $Q'_2$. A pair of resistors $R'_2$ and $R'_4$ are connected in series between the collector of transistor $Q'_2$ and the base of transistor $Q'_3$. A resistor $R'_3$ and a diode $D'_1$ are connected in series between ground and the junction point between the resistors $R'_2$ and $R'_4$. The condensers $C'_1$ may be connected in parallel with resistor $R'_2$.

By way of example, the transistors in FIG. 1 may be selected such that transistors $Q_1$, $Q_2$, $Q_3$ and $Q'_2$ are NPN types, and transistors $Q'_1$ and $Q'_3$ are PNP types. It is to be realized, of course, that the transistor types may be interchanged if desired.

In the circuit of FIG. 1, the output transistors $Q_2$ and $Q'_2$ are alternately turned on and off on alternate halt cycles to drive the load L.

The circuit of 2B is similar to the circuit of 2A except that circuit 2B operates on the negative half cycles of the signal whereas the circuit of 2A operates on the positive half cycles. The operation of circuit 2A will be described. The resistors $R_2$ and $R_3$ with the diode $D_1$ connected between them comprises a series circuit which is connected in parallel to the series circuit comprising the resistor $R_1$ and the load L. These two series circuits in parallel comprise a bridge circuit. The emitter of the switching transistor $Q_3$ is connected to the output point A. The base of the transistor $Q_3$ is connected through resistor $R_4$ to the connection point of the bridge opposite to that of point A which comprises the connection between the resistor $R_2$ and the diode $D_1$. The base of the transistor $Q_3$ receives DC bias voltage from the power source +B through the resistor $R_5$. The diode $D_2$ is connected between the collector of transistor $Q_3$ and the signal path lead 11 for the output transistors $Q_1$ and $Q_2$. The diode $D_2$ prevents injury to the transistor $Q_3$ during the negative half cycle of the signal. The capacitor $C_1$ connected in parallel with the resistor $R_2$ prevents oscillation of the circuit in the event the load L is inductive.

In operation the impedance RL of the load and the resistance values $r_1$, $r_2$, $r_3$, $r_4$ and $r_5$ of the resistors $R_1$, $R_2$, $R_3$, $R_4$ and $R_5$ are selected such that $R_1$ and $r_1$ are substantially less than $r_2$, $r_3$, $r_4$ and $r_5$. Also, the resistance values $r_2$, $r_4$ and $r_5$ of the resistors $R_2$, $R_4$ and $R_5$ are selected such that $r_5$ is much greater than $r_2$ and $r_4$. This assures that the transistor $Q_3$ will be held in the non-conducting state when the output transistor $Q_2$ is in the off state due to the values of resistors $R_2$, $R_4$ and $R_5$. In a specific circuit, resistance values chosen were $r_1$=0.5Ω, $r_2$ and $r_4$ = 1 kΩ, $r_5$ = 270 kΩ, and $r_3$ = 2 kΩ. The conducting voltage of the diode $D_1$ is designated as $V_{D1}$ and is generally 0.6 to 0.7 volts. The conducting voltage of the transistor $Q_3$ (voltage between its base and emitter) is designated $V_{BE}$ and is generally 0.6 and 0.7 volts. The voltage between the emitter and collector of the output transistor $Q_2$ is designated as $V_C$.

When both of the output transistors $Q_2$ and $Q'_2$ are in the off condition the potential at the output point A will be equal to ground potential. The base of the transistor $Q_3$ will be supplied voltage which exist across the resistors $R_4$, $R_2$ and $R_1$ from voltage $E_{+B}$. At this time the transistor $Q_3$ is not turned on because the resistance values of these resistors are selected such that $r_5$ is much greater than $r_4$, $r_2$ and $r_1$. Also, the series circuit consisting of the diode $D_1$ and the resistor $R_3$ is supplied with voltage produced across the resistors $R_2$ and $R_1$ but the voltage does not reach the conducting voltage $V_{D1}$ of the diode $D_1$ and hence the diode $D_1$ will remain in the off state. Also, the transistor $Q'_3$ and diode $D'_1$ will be in the off state.

When the positive half cycle of the signal has been supplied to the base of the transistor $Q_1$ the output transistor $Q_2$ will be turned on to the supply an output current $I_C$ through the resistor $R_1$ and the load L. A voltage across resistor $R_1$ and L will be produced based on the output current $I_C$. When the voltage exceeds the conducting voltage $V_{D1}$ of the diode $D_1$, the diode $D_1$ will be switched on and part of the output current $I_C$ will be shunted in a path through the resistor $R_2$, the diode $D_1$ and the resistor $R_3$ to ground.

The condition when the diode $D_1$ is in the off state and the transistor $Q_3$ is turned on to initiate protective operation is as follows:

$$V_{BE} \geqq V_C \times \frac{r_2+r_4}{r_2+o_4+r_5} + r_1 I_C \quad (1)$$

From this, it follows that $$I_C \geqq \frac{V_{BE}}{r_1} - \frac{V_C}{r^1} \cdot \frac{r_2+r_4}{r_2+r_4+r_5} \quad (2)$$

Figure 2:
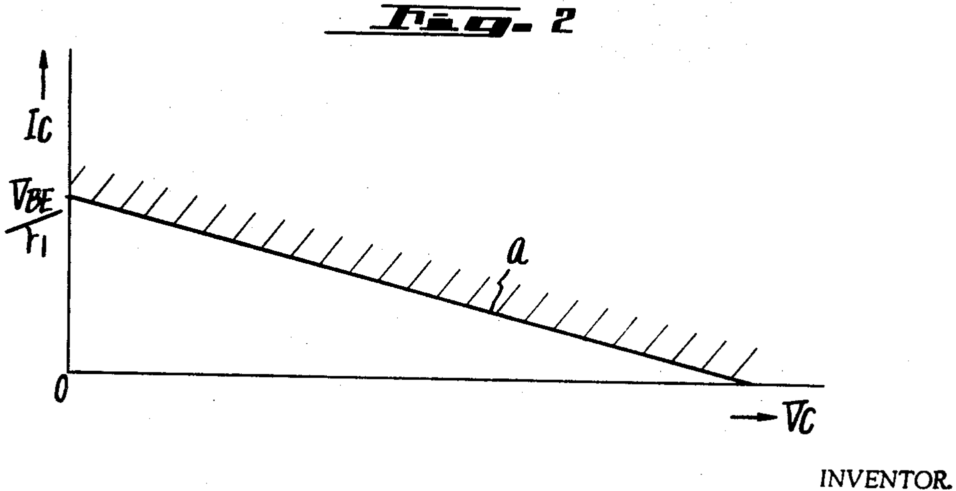
FIG. 2 is a graph for explaining the operation of the circuit exemplified in FIG. 1.

FIG. 2 is a graph of a plot of equation 2 and is designated by the straight line *a*. Equation 2 is satisfied in the area above line *a* and transistor $Q_3$ will be turned on for values above the line a to initiate protective operation. Under such conditions the transistor $Q_3$ is controlled by a voltage corresponding to the sum of the voltage between the collector and emitter of the transistor $Q_2$ and a voltage proportional to the collector current of the transistor $Q_2$. In actual practice the transistor $Q_3$ will occasionally be turned on in the inoperative area of the diode $D_1$ and this phenomenon occurs when a phase difference occurs between the output current $I_C$ and the voltage $V_C$ which could be caused by an inductive load L. When the voltage $V_C$ is zero, the maximum current is limited to $V_{BE}/r_1$ and the slope of the straight line a is expressed by $$-\frac{1}{r_1} \cdot \frac{r_2+r_4}{r_2+r_4+r_5}$$

When the diode $D_1$ is turned on, the following equation holds:

$$I_C > \frac{V_{D1}}{r_1+R_L} - \frac{V_C}{r_1+R_L} \cdot \frac{r_2}{r_2+r_4+r_5}.$$

Figure 3:
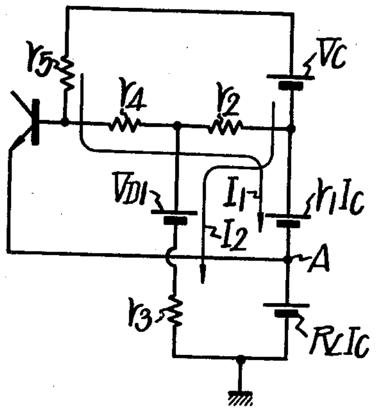
FIG. 3 is an equivalent circuit of the principal part of the circuit depicted in FIG. 1.

The following equations are obtained from the circuit shown in FIG. 3 which comprises an equivalent circuit of the device of FIG. 1.

$$V_C = (r_5+r_4+r_2) I_1 - r_2 I_2 \quad (3)$$

$$(r_1+R_L) I_C - V_{D1} = -r_1 I_1 + (r_2+r_3) I_2 \quad (4)$$

Solving the above equations (3) and (4), the following equations are obtained:

$$I_1 = \frac{(r_2+r_3)V_C + \{(r_1+R_L)I_C - V_{D1}\}r_2}{(r_5+r_4+r_2)(r_2+r_3) - r_2^2} \quad (5)$$

$$I_2 = \frac{(r_5+r_4+r_2)\{r_1+R_L)I_C - V_{D1}\} + r_2 V_C}{(r_5+r_4+r_2)(r_2+r_3) - r_2^2} \quad (6)$$

The following equation may be obtained from the equivalent circuit of FIG. 3:

$$V_{BE} = r_4 I_1 + r_2 (I_1 - I_2) + r_1 I_C \quad (7)$$

The equation (7) may be rearranged by substituting $I_1$ and $I_2$ from equations (5) and (6) to obtain the following equation:

$$I_C = \frac{V_{BE}\{(r_2+r_3)(r_4+r_5) + r_2 \cdot r_3\} - V_{D1} \cdot r_2 \cdot r_5}{r_1\{r_2 \cdot r_4 + r_3(r_5+r_4+r_2)\} - R_L \cdot r_2 \cdot r_5} - \frac{V_C \cdot r_4 \cdot (r_2+r_3) + r_2 \cdot r_3}{r_1\{r_2 \cdot r_4 + r_3(r_5+r_4+r_2)\} - R_L \cdot R_2 \cdot r_5} \quad (8)$$

In the case where $$R_L > \frac{r_1\{r_2 \cdot r_4 + r_3(r_5+r_4+r_2)\}}{r_2 \cdot r_5},$$

the output current $I_C$ will be smaller than zero from equation (8). In actual practice $I_C \geqq 0$, so when the impedance $R_L$ of the load is greater than the value given above the transistor $Q_3$ will remain in the off state and will exert no influence on the amplifying operation.

FIG. 4 includes a curve *b* which is expressed by the equation (8). In the area A above the curve *b* transistor $R_3$ will be switched on to limit the output current $I_C$ along curve *b*. Thus, in the event that the impedance $R_L$ of the load is less than $$R_{L_O}=\frac{r_1\{r_2\cdot r_4+r_3(r_5+r_4+r_2)\}}{r_2\cdot r_5},$$

the protective operation will be initiated and the output current $I_C$ will be limited to the curve b. Also, when the impedance $R_L$ of the load is greater than $R_{L_O}$ the transistor $Q_3$ will not be turned on and the output current will not be limited by the protective circuit. Under these conditions, the possible output current is generally limited by curve *c* which can be expressed by the equation $$I_C\approx\frac{E_{+B}}{r_1+R_L}.$$

The protective operation may be appreciated by considering the characteristics of the output transistor. The relationships given by equation (8) are illustrated in FIG. 5. The straight lines $d_0$, $d_1$, $d_2$ and $d_3$ in FIG. 5 represent limiting characteristic of the protective circuit when the load impedance $R_L$ is smaller than $R_{L_O}$ shown in FIG. 4. The curve $d_0$ is the limiting characteristic of the circuit when the load impedance $R_L$ is zero. The line $d_3$ has the steepest slope and is the limiting characteristic when the load impedance $R_L$ is equal to or slightly less than $R_{L_O}$. With such load impedances, the circuit performs the protecting operation in the areas above the straight lines and maximum currents for the particular load impedances are respectively limited by the straight lines $d_0$, $d_1$, $d_2$ and $d_3$.

That is to say, if the power source voltage $E_{+B}$ is $E_{+B_1}$, the voltage $V_C$ between the emitter and collector of the output transistor $Q_2$ will vary between zero and $E_{+B_1}$. In the case where the load line caused by the load impedance $R_L$ is included in an angle $\theta_1$ (in other words, the inclination angle of the load line to the abscissa is smaller than $\theta_1$), which occurs when the load impedance $R_L$ is greater than $R_{L_O}$ the limiting straight line characteristics $d_0$, $d_1$, $d_2$ and $d_3$, do not exist and the circuit performs its normal operation without any limitation on the output current $I_C$.

On the other hand, if the load impedance $R_L$ lies in an angle $\theta_2$ the output current $I_C$ is limited at the intersections of the load lines $Z_0$, $Z_1$, $Z_2$ and $Z_3$ with the straight lines $d_0$, $d_1$, $d_2$ and $d_3$ and currents will not flow at values above the intersection points. This is true even if the power source voltage is changed from $E_{+B_1}$ to $E_{+B_2}$ as shown in the curve and the foregoing relationships remain unchanged. The load lines in this case are indicated by $Z'_0$, $Z'_1$, $Z'_2$ and $Z'_3$.

FIG. 6 illustrates the operation of the output circuit 2 based on the above characteristics. In FIG. 6, the reference character Z indicates a load line where the load impedance has a certain value exceeding $R_{L_O}$. When the voltages $V_C$ between the collectors and emitters of the transistors $Q_2$ and $Q'_2$ are respectively in the range from zero to $E_{+B_1}$ ($E_{+B_1}$ being the power source voltage and $2E_{+B_1}(-E_{+B_1}\sim+E_{+B_1})$ being applied between the collector of the transistor $Q_2$ and the emitter of the transistor $Q'_2$ in FIG. 1), the diodes $D_1$ and $D_2$ will be in the on state and the output current $I_C$ will be limited by the limiting straight lines $d_0$, $d_1$, $d_2$, $d_3$ and $d_4$ corresponding to the load impedances in respoinse to the switched-on operation of the transistor $Q_3$. When the voltages $V_C$ of the transistors $Q_2$ and $Q'_2$ between the emitters and collectors are greater than the power source voltage $E_{+B_1}$ the diodes $D_1$ and $D'_1$ will be in the off state and the transistors $Q_3$ and $Q'_3$ will be in the off state and as a result the output current $I_C$ will be limited by the straight line a shown in FIG. 2. That is, the areas A and A' in FIG. 6 are protective areas of the transistors $Q_2$ and $Q'_2$ of which output currents $I_C$ do not flow to the transistors.

In FIG. 6 the load line Z illustrates the impedance of a load L of pure resistance. However, actual speakers include inductive elements and the load line for such speakers from an ellipse on which the load line Z is the major axis. This ellipse is illustrated by $Z_L$ in FIG. 6. When the output is small, the ellipse $Z_L$ does not enter the areas A and A', but when the output is great there is the possibility that the ellipse $Z_L$ will enter the areas A and A' to turn on the switching transistor $Q_3$ and cut off the output wave form.

To eliminate such a possibility, a bias voltage may be produced by rectifying the output voltage generated by the load L. If this voltage is supplied to one side of the bridge consisting of the resistor $R_1$, the load L and the resistors $R_2$ and $R_3$, the switching level of the switching transistor $Q_3$ will be changed as a function of the output voltage to alter the range of the protective areas A and A' thus avoiding cutoff of the wave form when an inductive load exists.

FIG. 7 illustrates such a modification of the invention. The voltage across the load L is applied to the diodes $D_3$ and $D'_3$ through the resistor $R_7$. These rectify it and the rectified output is supplied to connection points, respectively, between the resistors $R_{3a}$, $R_{3b}$, $R'_{3a}$ and $R'_{3b}$. The resistors $R_{3a}$, $R_{3b}$, $R'_{3a}$ and $R'_{3b}$ correspond to the resistors $R_3$ and $R'_3$ in FIG. 1, for example. Capacitors $C_2$ and $C'_2$ are connected in parallel with the resistors $R_{3b}$ and $R'_{3b}$, respectively. Thus, the diodes $D_1$ and $D'_1$ are biased by the output voltage thus altering the switching levels of the switching transistors $Q_3$ and $Q'_3$. In FIG. 6, the protective operation areas A and A' move outwardly corresponding to $+E_1$ and $-E_1$ thus preventing the elliptical load line $Z_L$ from entering the areas A and A'. As the elliptical load line $Z_L$ expands, the output increases and the amount of movement of $+E_1$ and $-E_1$ increases to move the areas A and A' thus preventing interruption of the output wave form.

Thus, with the present invention the protective operation areas move in response to the output voltage to prevent interruption of the output wave form even where the load is inductive. Also, when the load has been short-circuited thereby reducing the load impedance $R_L$ to a value smaller than a predetermined value $R_{L_O}$, protective operation will be initiated and the response speed will be very high insuring that the output transistor is protected.

Also, the value of the load impedance $R_{L_O}$ at which the protective operation will be initiated can be selected and this value can be set at a relatively low impedance so that the load can be selected from a wide range. This, for example, would allow a plurality of speakers to be operated in parallel.

Where the load impedance $R_{L_O}$ for initiating the protective operation is low the protective circuit will operate only during times when the load is short-circuited. This is true because although a large current will flow instantaneously in the case of the sound of music, the mean value of the large current is relatively small. Thus, the average current is very low.

Although the invention has been described for examples where positive and negative power sources are utilized and the load is directly connected between the output point A and ground, the invention is also applicable to a circuit construction where positive and negative power source is used and a capacitor is connected in series to the load L. In such case the capacitor is connected between the load L and ground the connection point of the capacitor with the load L is utilized as a grounding point of the protective circuit DC-wise.

It is apparent that many modifications and variations may be effected without departing from the scope of the novel concepts of this invention.

I claim:

1. An amplifier protective circuit comprising:
- a first transistor used for amplifying input signals supplied to a first electrode of the same;
- a voltage source;
- means for connecting a second electrode of said first transistor to said voltage source;
- first circuit means for connecting a third electrode of said first transistor to a load and detecting a voltage in proportion to a current flowing through said first transistor;
- second circuit means connected between the second and third electrodes of said first transistor;
- said second circuit means detecting a voltage proportional to a voltage between the second and third electrodes of said first transistor;
- a second transistor connected to the first electrode of said first transistor to limit the current flowing through said first transistor;
- a first electrode of said second transistor connected to said second circuit means so that said second transistor is operated by the detected outputs of said first and second circuit means;
- third circuit means connected between said second circuit means and ground; and,
- said third circuit means including at least one diode and varying the limiting conditions for current flow through said first transistor in response to the voltage detected by said second circuit means.

2. An amplifier protective circuit as claimed in claim 1 wherein said first circuit means comprises a resistor connected between said third electrode of the first transistor and the load.

3. An amplifier protective circuit as claimed in claim 1 wherein said second circuit means comprises a plurality of series connected resistors and said third circuit means are connected to a junction point between said series-connected resistors.

4. An amplifier protective circuit as claimed in claim 3 wherein said first electrode of the second transistor is connected to one of the junction points between said series connected resistors.

5. An amplifier protective circuit as claimed in claim 1 wherein a third electrode of said second transistor is connected to the load.

6. An amplifier protective circuit as claimed in claim 1 wherein said third circuit means comprises a series-connected circuit including said one diode and at least one resistor.

7. An amplifier protective circuit as claimed in claim 1 wherein said first transistor is of the NPN type and said first, second and third electrodes of the first transistor are a base, collector and emitter, respectively.

8. An amplifier protective circuit in accordance with claim 1 further comprising fourth circuit means connected between said third circuit means and said load for supplying the third circuit means with a voltage proportional to the output voltage across the load.

9. An amplifier protective circuit as claimed in claim 8 wherein said third circuit means comprises a series-connected circuit of said one diode and at least one resistor, and said fourth circuit means supplies said diode with the voltage proportional to the output voltage across the load to vary the condition for switching operation of said diode.

10. An amplifier protective circuit as claimed in claim 9 wherein said fourth circuit means comprises a series-connected circuit of a second diode and a resistor, said second diode detecting the output voltage across the load and supplying the detected output to said one diode of said third circuit means.

11. A protective circuit comprising:
- an output transistor to which an input is supplied;
- a power supply connected to a first electrode of said output transistor;
- a first resistor with one side connected to a second electrode of said output transistor;
- a load connected to the other side of said first resistor;
- a protective transistor with a first electrode connected to the base electrode of said output transistor;
- second and fourth resistors connected in series between the base of said protective transistor and said one side of said first resistor;
- a diode connected between ground and the junction point between said second and fourth resistors;
- a third resistor connected in series with said diode between ground and the junction point between said second and fourth resistors;
- a fifth resistor connected between said power supply and the base of said protective transistor; and
- means for detecting the voltage across said load and coupling said detected voltage to said protective transistor.

12. A protective circuit according to claim 11 wherein said detecting means comprises a rectifier.

* * * * *